Jan. 6, 1925.                                              1,522,279
F. N. SPRAGUE
THREE-POINT SUSPENSION SPRING CONSTRUCTION FOR AUTOMOBILES AND LIKE VEHICLES
Filed Feb. 6, 1923
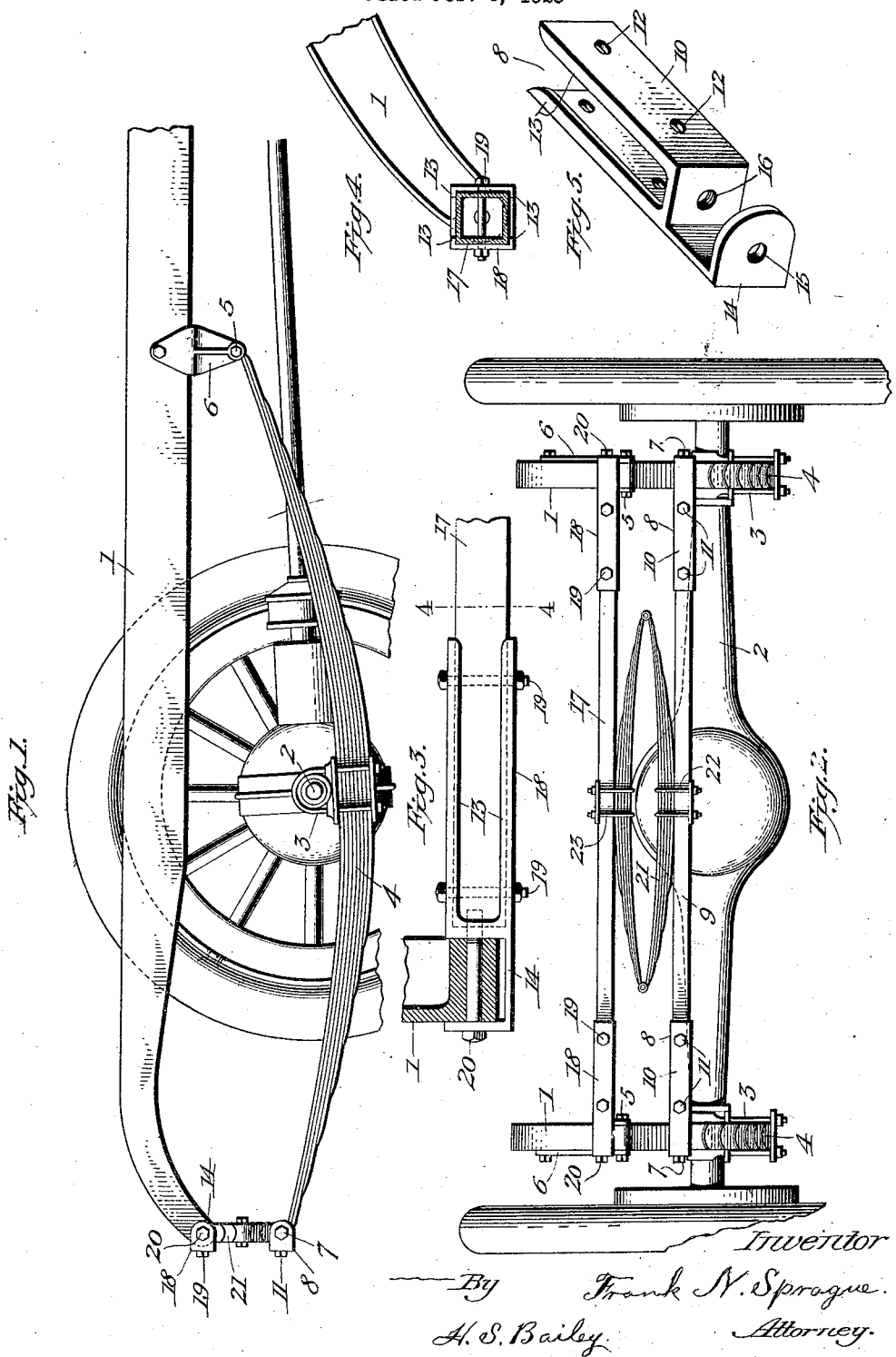

Patented Jan. 6, 1925.

1,522,279

UNITED STATES PATENT OFFICE.

FRANK N. SPRAGUE, OF HOLYOKE, COLORADO.

THREE-POINT SUSPENSION SPRING CONSTRUCTION FOR AUTOMOBILES AND LIKE VEHICLES.

Application filed February 6, 1923. Serial No. 617,353.

*To all whom it may concern:*

Be it known that I, FRANK N. SPRAGUE, a citizen of the United States of America, residing at Holyoke, county of Phillips, and State of Colorado, have invented a new and useful Three-Point Suspension Spring Construction for Automobiles and like Vehicles, of which the following is a specification.

My invention relates to improvements in three point suspension spring construction for automobiles and like vehicles.

The main object of the invention is to provide a spring construction by which the automobile body is spring-supported at its rear end at three points, namely, upon opposite sides of the rear portions of the frame, and at a point midway between the rear ends of the frame, whereby greater flexibility in the spring action is obtained when obstructions are encountered by both rear wheels, simultaneously, or by either one of the said wheels.

Further, to provide a rear spring construction for automobile bodies comprising two semi-elliptic side springs, and a full elliptic rear spring, the latter spring being interposed centrally between cross bars, which are secured, respectively to the rear ends of the side bars, and the rear ends of the side springs, whereby the resiliency of both side springs is obtained by means of the "evener" effect of the elliptic spring, together with the cushioning action of the said elliptic spring, particularly where obstructions are encountered by the rear wheels independently.

Further, to provide a spring construction which practically eliminates side sway, and side jolt to the car body, and which can be installed on cars in present use, without necessitating changes either in the side bars, or the construction of the side springs with which the car is provided.

These objects are accomplished by the mechanism illustrated in the accompanying drawings, in which:

Fig. 1 is a side view of the rear portion of the frame or chassis of an automobile, showing the improved spring construction in connection therewith.

Fig. 2 is a rear view of Fig. 1.

Fig. 3 is an enlarged plan view partly in section showing a portion of the cross bar, which connects the rear ends of the side bars of the chassis together with the connecting member for securing the end of the cross bar to the end of the side bar.

Fig. 4 is a section on the line 4—4 of Fig. 3, and

Fig. 5 is a perspective view of the connection which is secured to the ends of the two cross bars.

Referring to the accompanying drawings:

The numeral 1, indicates the side bar of an automobile chassis, which may be of any of the forms in common use; and 2, indicates the rear axle, the end portions of which rest upon and are secured by U-bolt connections 3, to semi-elliptic side springs 4, midway of the length of the said springs.

The forward ends of the springs 4 are preferably secured directly to bolts 5 which are supported in brackets 6 which are bolted to the side bars, and the rear ends of the springs are secured directly to bolts 7 which are supported in the outer ends of connections 8, which are secured upon the ends of a cross bar 9, which is preferably hollow, and rectangular in cross section.

The connections or castings 8 are identical in construction, each comprising yoke shaped body portion 10, which receive the end portion of the cross bar 9, and is rigidly secured thereto by bolts 11 which pass through elongated holes 12 in the sides of the said body portion 10, and through bolt holes in the end portions of the cross bar, the elongated holes 12, compensating for any slight variations in the positions of the bolt holes in the cross bar.

The upper and lower edges of the side members of the said body portion 10, terminate in narrow longitudinal introverted flanges 13, which engage the cross bar and act in conjunction with the bolts 11 to prevent a sagging movement of the connections 8, with respect to the ends of the cross bar 9. The outer end of each connection 8 terminates in an L-shaped projection 14, the end member of which is provided centrally with a smooth bolt hole 15 which is in axial line with a threaded bolt hole 16 in the adjacent end of the yoke shaped body portion of the connections, and the bolts 7 which support the outer ends of the springs 4, are passed through the smooth holes 15, and screwed into the threaded holes 16, as will be seen by reference to the drawings.

The rear ends of the side bars 1 are also connected by a cross bar 17, to the ends of which connections or castings 18 are secured, by bolts 19, and these connections 18 are identical in construction with the connections 8, and therefore, require no separate description. The L-shaped ends 14 of the connections 18 support bolts 20, which pass through the usual apertured rear ends of the side bars 1 and thus form a pivotal connection between the cross bars 17 and the rear ends of the side bars. An elliptic spring 21 is interposed between the cross bars 9 and 17, and midway of the length of said bars, and is secured to the said bars by U-bolts 22 and 23 which secure, respectively, the lower member of the spring 21 to the cross bar 9, and the upper member of the spring to the cross bar 17. It will thus be seen from the foregoing description, taken in connection with Figures 1 and 2 of the drawings, that the frame of the car is spring-supported at three points, namely, at the forward ends of the two side springs 4, and upon the elliptic spring 21.

As the elliptic spring 21 is located midway between the two rear wheels, a shock resulting from obstructions encountered by both rear wheels, is received by the side springs and transferred to the elliptic spring which further cushions the said shock, the diminished force of which is passed on to the side bars at a point midway between their ends where the load is equalized. As the front ends of the side springs are connected to the bolts 5 in the rigid brackets 6, the lengthening of the springs under compression causes an outward swing of the cross bar 9 and elliptic spring 21 and a turning movement of the cross bar 17 on the bolts 20, thus obviating the need of a shackle at either end of the side springs.

When either rear wheel encounters an obstruction independently of the other rear wheel, the shock is first received by the side spring and then transmitted to the elliptic spring which further cushions the shock and delivers its spent force at a point midway between the rear ends of the side bars, thus practically eliminating the side bump or jolt which would have been imparted to that side of the car whose wheel encountered the obstruction, if the rear end of the side spring had been attached to the rear end of the side bar, as in spring constructions in present use. Moreover, the elliptic spring acts as an "evener" when the rear wheels encounter obstructions, independently, that is, the upward movement of one end of the elliptic spring, due to the upward thrust of one of the side springs, causes a downward thrust on the opposite side spring, so that the cushioning effect of all three springs is utilized.

The improved spring arrangement not only possesses all of the good points of the side and cross spring construction, but it gives greater resiliency of spring action under all road conditions, and also practically eliminates the side jolts which are inevitable where both ends of the side springs are connected to the side bar.

Having described my invention, what I claim as new, and desire to secure by Letters Patent, is:

1. In automobile spring construction, the combination with the body supporting side bars and the axle, of semi-elliptic springs which are secured intermediate of their ends to said axle, and at their forward ends to the side bars, a cross bar pivotally attached at its ends to the rear ends of said springs, a cross bar pivotally attached at its ends to the rear end of the side bars, and an elliptic spring interposed between the cross bars midway between their ends and secured to said cross bars.

2. In automobile spring construction, the combination with the body-supporting side bars and the axle of semi-elliptic springs which are secured intermediate of their ends to said axle and at their forward ends to the side bars, a cross bar and pivot bolts in the ends of said cross bar for supporting the rear ends of said springs; a cross bar and pivot bolts in the ends thereof which extend through the rear ends of the side bars, and an elliptic spring interposed between said cross bars midway between their ends, and secured to said cross bars.

3. In automobile spring construction, the combination with the body supporting side bars and the axle, and semi-elliptic springs secured at their forward ends to the side bars, and intermediate of their ends to the axle; of a cross bar having castings bolted to its ends, which are provided with pivot bolts which pass through the rear ends of said springs; a cross bar having castings in its ends provided with pivot bolts which pass through the rear end of the said side bars; and an elliptic spring which is interposed between said cross bars midway of their ends and secured to said cross bars.

4. In automobile spring construction, the combination with the body supporting side bars and the axle and semi-elliptic springs which are attached at their forward ends to the side bars and intermediate of their ends, to the axle, of means for connecting the rear ends of said springs consisting of a cross bar having yoke shaped castings extending over and bolted to its end portions and provided with L-shaped projections and bolts supported in said L-shaped projections, and the closed end of said yoke, which pass through the rear ends of said springs; a cross bar having similar castings on its ends and bolts carried thereby which pass through the rear ends of said side bars, and an elliptic spring which is interposed between said cross bars intermediate of their ends and secured to said cross bars.

In testimony whereof I affix my signature in presence of two witnesses.

FRANK N. SPRAGUE.

Witnesses:
G. SARGENT ELLIOTT,
EMILY ROBERTS HANNING.